(12) United States Patent
Vuyyuru et al.

(10) Patent No.: US 10,044,817 B2
(45) Date of Patent: Aug. 7, 2018

(54) PROVIDING WIRELESS SERVICES TO A CONNECTED VEHICLE

(71) Applicant: TOYOTA JIDOSHA KABUSHIKI KAISHA, Toyota-shi, Aichi-ken (JP)

(72) Inventors: Rama Vuyyuru, Mountain View, CA (US); John Mark Agosta, Mountain View, CA (US); Rahul Parundekar, Sunnyvale, CA (US); Daisuke Hiroki, Toyota (JP)

( * ) Notice: Subject to any disclaimer, the term of this patent is extended or adjusted under 35 U.S.C. 154(b) by 255 days.

(21) Appl. No.: 14/332,950

(22) Filed: Jul. 16, 2014

(65) Prior Publication Data
US 2016/0021190 A1    Jan. 21, 2016

(51) Int. Cl.
| | |
|---|---|
| *G06F 13/00* | (2006.01) |
| *H04L 29/08* | (2006.01) |
| *H04W 4/021* | (2018.01) |
| *H04W 4/50* | (2018.01) |
| *H04W 4/029* | (2018.01) |

(52) U.S. Cl.
CPC .............. *H04L 67/18* (2013.01); *H04W 4/022* (2013.01); *H04W 4/029* (2018.02); *H04W 4/50* (2018.02)

(58) Field of Classification Search
CPC ............... H04L 29/06; H04L 29/08072; H04L 29/08657; H04L 41/12; H04L 41/22; H04L 41/0213; H04L 67/18; H04W 4/02; H04W 64/00; H04W 1/72572; H04W 29/08657; H04W 4/22; H04W 4/29; H04W 4/50; G01C 21/20
USPC .......................................... 455/457; 709/223
See application file for complete search history.

(56) References Cited

U.S. PATENT DOCUMENTS

| | | | | |
|---|---|---|---|---|
| 9,247,523 | B1* | 1/2016 | Bhatia | H04W 64/006 |
| 2002/0009992 | A1* | 1/2002 | Jensen | H04W 16/18 |
| | | | | 455/446 |
| 2005/0255856 | A1* | 11/2005 | Griffin | H04W 36/0083 |
| | | | | 455/456.1 |
| 2007/0277113 | A1* | 11/2007 | Agrawal | G06Q 10/109 |
| | | | | 715/764 |
| 2012/0029890 | A1* | 2/2012 | Hanley | B01D 3/4211 |
| | | | | 703/2 |
| 2013/0124087 | A1* | 5/2013 | Bauchot | G01C 21/00 |
| | | | | 701/487 |
| 2014/0200038 | A1* | 7/2014 | Rao | H04L 67/2847 |
| | | | | 455/457 |
| 2014/0235177 | A1* | 8/2014 | Shaffer | G01C 21/20 |
| | | | | 455/67.11 |

(Continued)

FOREIGN PATENT DOCUMENTS

| | | |
|---|---|---|
| JP | 2009126335 A | 6/2009 |
| JP | 2010018072 A | 1/2010 |

*Primary Examiner* — Robert B Harrell
(74) *Attorney, Agent, or Firm* — Burbage Law, P.C.; Jon-Michael Burbage; Elizabeth Ruzich

(57) ABSTRACT

The disclosure includes a system and method for provisioning wireless application services in sparsely connected wireless environments. The system includes a processor and a memory storing instructions that, when executed, cause the system to: estimate journey requirements; generate a current connectivity map based on driving-related data; generate a current connectivity map based on driving-related data; estimate services for a current journey; and generate a prioritized list of services and at least one expiration time for one of the services.

20 Claims, 6 Drawing Sheets

(56) References Cited

U.S. PATENT DOCUMENTS

2014/0257695 A1* 9/2014 Annapureddy ........ G01C 21/00
                                                        701/537

* cited by examiner

PROVIDING WIRELESS SERVICES TO A CONNECTED VEHICLE

BACKGROUND

The specification relates to provisioning wireless application services in sparsely connected wireless environments. In particular, the specification relates to generating a prioritized list of services using a current connectivity map and at least one expiration time for one of the services.

Wireless network availability and performance widely varies in mobile environments, specifically when driving on highways at higher speeds. In the car the driver relies on numerous applications. Each may require different demands for network services. For example, automated speech recognition may require bandwidth for transmitting audio segments. A map application may require real-time traffic updates. Or the applications themselves may require software updates. These demands have differing bandwidth requirements and priority.

Existing solutions will buffer/cache contents in advance based on application requests or location information to improve application performance. These solutions require that the user specifically start or select applications manually in order to achieve good performance. These solutions will only support certain content types like music streaming, or web-site data but not other content types required by journey related services.

SUMMARY

According to one innovative aspect of the subject matter described in this disclosure, a system for provisioning wireless application services in sparsely connected wireless environments includes a processor and a memory storing instructions that, when executed, cause the system to: estimate journey requirements; generate a current connectivity map based on driving-related data; generate a current connectivity map based on driving-related data; estimate services for a current journey; and generate a prioritized list of services and at least one expiration time for one of the services.

In general, yet another innovative aspect of the subject matter described in this disclosure may be embodied in methods that include: updating the priorities of the services and expiration times for the current journey based on at least one of local real-time connectivity information generated from radio receivers, an estimation of local connectivity information generated from radio receiver data about real-time measurement of available bandwidth, and crowd-sourced cloud data; determining whether the current journey has ended and, responsive to the current journey continuing, continuing to generate the connectivity map based on driving-related data until the current journey ends; generating an overall connectivity map prior to generating the current connectivity map; and retrieving data related to one or more of the prioritized list of services and the expiration time.

In general, yet another innovative aspect of the subject matter described in this disclosure may be embodied in a computer program product comprising a non-transitory computer-usable medium including a computer-readable program, wherein the computer-readable program when executed on a computer causes the computer to: estimate a present journey for a user based on time synchronicity data and historical journey data; determine one or more preferred network services for a user based on preference hierarchy data; determine that the mobile system will enter a dead zone based on the estimation of the present journey and connectivity map data describing the dead zones, wherein the dead zone is a geographic area having limited connectivity to a mobile data network; determine network services data configured to enable the mobile system to consume the preferred network services while in the dead zone; and transmit a request for network services data configured to enable the mobile system to consume the preferred network services while in the dead zone.

These and other embodiments may each optionally include one or more of the following operations and features. The journey requirements may be based on user preferences; the driving-related data may include a connectivity forecast for a current journey and a historical connectivity index; the sensor data may include vehicle data and current network sensor data; estimating services for the current journey may be based on journey data, user preferences, and context information; the prioritized list of services may be based on priorities and urgency of the service; the expiration time of the service is based on at least one of a service deadline and a location.

Throughout the disclosure, the term "data" may be used to represent any digital data undergoing the transfer functions or operations described herein. The digital data may include, but is not limited to, network services data, connectivity map data, journey data, user profile data, time synchronicity data, historical journey data, preference hierarchy data, dead zone data, navigation map data, mesh network data, velocity data, data to be shared between two or more entities (e.g., servers, vehicle systems, mobile client devices, client devices, etc.) and data to be transferred between two or more entities.

The disclosure is particularly advantageous in a number of respects. For example, the system considers application-specific demands and content expiration times to plan a schedule for application communication jobs, within the constraints of available connectivity estimates. In addition the schedule generated by this method considers the bandwidth demands, priority and urgency of each application service request to obtain the best overall level of service, leading to a better user experience. The computed schedule includes pre-fetching data for anticipated service requests when the time and bandwidth constraints allow. The proposed method automatically identifies network service demands by learning without any user interaction. By identifying service requirements, system can pro-actively manage content required for multiple services in the face of poor or missing wireless connectivity.

The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
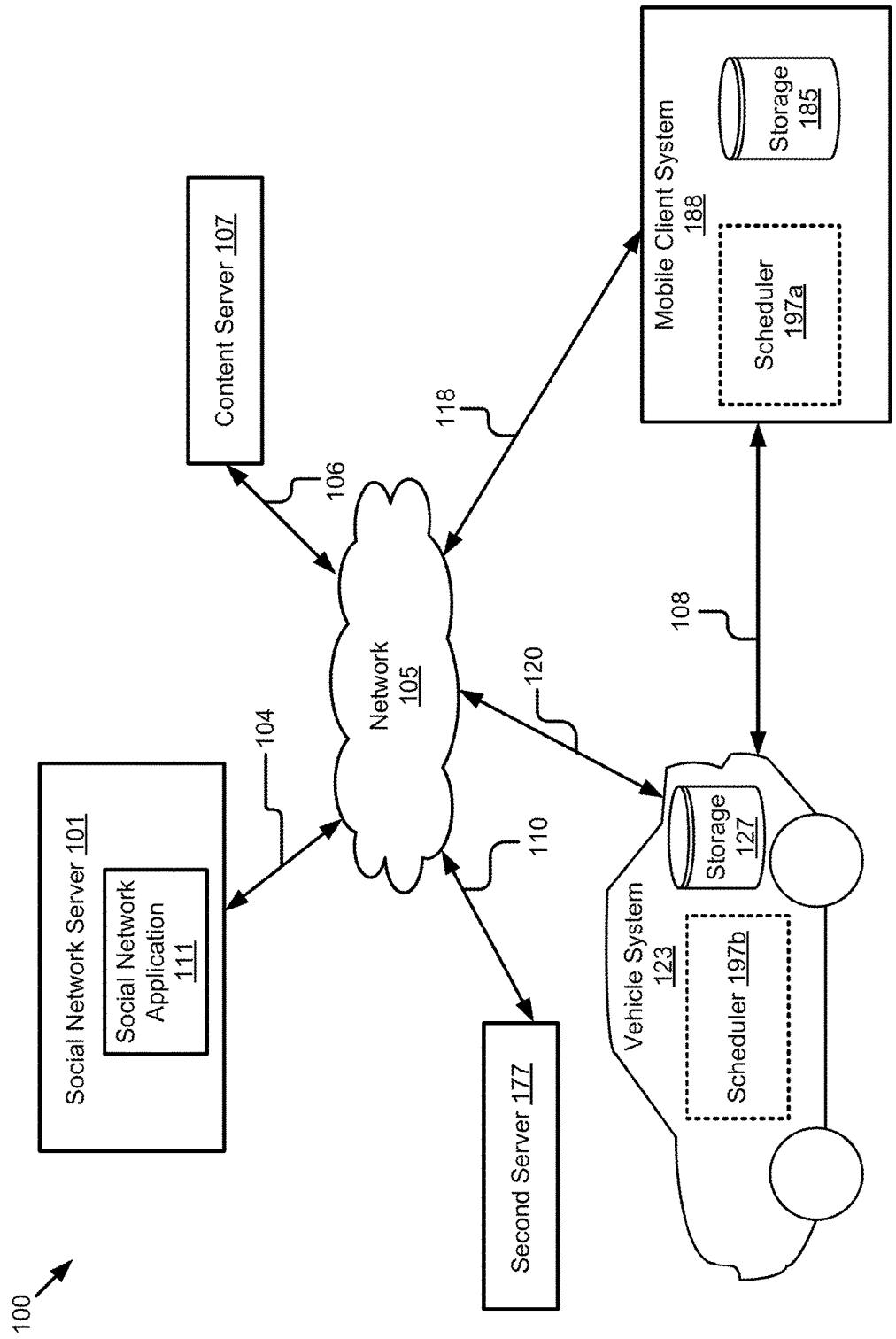
FIG. 1 is a block diagram illustrating an example system for provisioning wireless application services in sparsely connected wireless environments.

FIG. 1 illustrates a block diagram of some embodiments of a system 100 for provisioning wireless application services in sparsely connected wireless environments. The system 100 includes a social network server 101 communicatively coupled to the network 105 via signal line 104, a mobile client system 188 communicatively coupled to the network 105 via signal line 118, a vehicle system 123 communicatively coupled to the network 105 via signal line 120, a content server 107 communicatively coupled to the network via signal line 106, and a second server 177 communicatively coupled to the network 105 via signal line 110. The system 100 may include other servers or devices not shown in FIG. 1 including, for example, a traffic server for providing traffic data, a weather server for providing weather data, and a map server for providing map data, etc. The system 100 may further include a global positioning system ("GPS") satellite communicatively coupled to the vehicle system 123 or the mobile client system 188 for providing any combination of graphical and audio GPS navigation instructions.

While FIG. 1 illustrates one social network server 101, one mobile client system 188, one vehicle system 123, a content server 107, and one second server 177, the disclosure applies to a system architecture including one or more social network servers 101, one or more mobile client devices 188, one or more vehicle systems 123, and one or more second servers 177. Furthermore, although FIG. 1 illustrates one network 105 coupled to the entities of the system 100, in practice one or more networks 105 of various types may be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 105 may include a GPS satellite for providing GPS navigation to the vehicle system 123 or the mobile client system 188. The network 105 may be a mobile data network such as 3G, 4G, LTE, Voice-over-LTE ("VoLTE") or any other mobile data network or combination of mobile data networks. In some embodiments, the network 105 may be a combination of different networks.

The mobile client system 188 may be a mobile computing device that includes a memory and a processor, for example, a laptop computer, a desktop computer, a tablet computer, a mobile telephone, a personal digital assistant ("PDA"), a mobile e-mail device, a portable game player, a portable music player, a connected device or wearable computer (e.g., a smart watch, smart glasses, fitness tracker, etc.), a television with one or more processors embedded therein or coupled thereto, or other electronic device capable of accessing the network 105. A user may interact with the mobile client system 188. The mobile client system 188 may be communicatively coupled to the vehicle system 123 via a signal line 108. The signal line 108 may be a hard wired or wireless communicative coupling between the mobile client system 188 and the vehicle system 123. In some embodiments, the vehicle system 123 may access the network 105 at least in part via the mobile client system 188. In some embodiments, the mobile client system 188 may be a device similar to the vehicle system 123.

In some embodiments, the mobile client system 188 may be directly coupled to the network 105 via the signal line 118 for communication with other entities in the system 100. The mobile client system 188 may include functionality to enable a user to consume network services. The network services may include any service accessible via the network 105. For example, the network services include navigation instructions, streaming audio or video (such as Pandora™, Spotify™, iTunes™, Google Play™YouTube™, etc), social networking (such as FaceBook™, Google+™, LinkedIn™Tinder™, QQ™, etc.), microblogging (such as Twitter™, Tumblr™), online chatting (such as SnapChat™, WhatsApp™, etc.), online content sharing (such as Instagram™Pinterest™, etc.), email (such as Gmail™, Outlook™, Yahoo Mail™, etc.), file sharing (such as DropBox™, Google Drive™, MS One Drive™, Evernote™, etc), calendar and scheduling (such as Google Calendar™, MS Outlook™, etc.), etc.

The mobile client system 188 may include a scheduler 197a and storage 185. The scheduler 197a is depicted with dashed lines in FIG. 1 in order to indicate that the scheduler 197b is optionally stored on the mobile client system 188. For example, the scheduler 197a may be present in the vehicle system 123 or any other component of the system 100.

The scheduler 197a may include code and routines for determining connectivity map data describing the mobile network coverage area and one or more dead zones for a geographic area. For example, the connectivity map data describes the availability of a mobile data network such as 3G, 4G, LTE, Voice-over-LTE ("VoLTE") or any other mobile data network or combination of mobile data networks in a geographic area. In one implementation, the connectivity map data may describe the mobile network coverage area and one or more dead zones along the roadways of a geographic area. For example, the connectivity map data only describes the availability of a mobile network along the roadways of geographic area, and does not describe the availability of the mobile network when the mobile communication node is not on the roadway.

The scheduler 197a may include code for generating an overall connectivity map and a current connectivity map based on a journey associated with a user. For example, the overall connectivity map could be for San Francisco and the current connectivity map could be for the connectivity during a trip within San Francisco. The scheduler 197a may generate real-time connectivity data based on sensor data and use the current connectivity map and the real-time connectivity data to estimate services for the current journey. The scheduler 197a may generate a prioritized list of services. For example, a map application has first priority, a streaming music application has second priority, and an email application has third priority based on actual services requested, real-time measurement of available bandwidth, or crowd-sourced cloud data.

In some embodiments, the scheduler 197a can be implemented using hardware including a field-programmable gate array ("FPGA") or an application-specific integrated circuit ("ASIC"). In some other embodiments, the scheduler 197a can be implemented using a combination of hardware and software. The scheduler 197a may be stored in a combination of the devices and servers, or in one of the devices or servers.

The storage 185 can be a non-transitory storage medium that stores data for providing the functionality described herein. The storage 185 may be a dynamic random access memory (DRAM) device, a static random access memory (SRAM) device, flash memory, or some other memory devices. In some embodiments, the storage 185 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the mobile client system 188 may be a smartphone accessing the network 105. The network 105 may be a mobile data network as described above. A user of the mobile client system 188 may be accessing the network 105 to enable a user of the mobile client system 188 to consume one or more services. The mobile client system 188, or the service itself, may be configured so that the mobile client system 188 must have access to services data in order to provide the user with services. For example, the mobile client system 188 receives services data via the network 105 and uses the services data to provide the service to the user. The service data may be any digital data used to provide a service via the network 105 to a user.

The user of the vehicle system 123 may approach a dead zone. While in the dead zone, the mobile client system 188 is unable to access the network 105 and service data to enable the mobile client system 188 to continue providing the service to the user. As will be described in more detail below, the scheduler 197a uses the prioritized list of services to continue to provide the top services to the user while the vehicle system 123 is in the dead zone.

The vehicle system 123 may be a mobile communication node. For example, the vehicle system 123 may be a vehicle (e.g., an automobile, a bus, an airplane, a boat), a robot, a drone, a bionic implant, or any other mobile system. In some embodiments, the vehicle system 123 may include a computing device that includes a memory and a processor. A user may interact with the vehicle system 123. In some embodiments, the vehicle system 123 may include a mobile client device. For example, the vehicle system 123 may include a tablet, a smartphone, an infotainment system or another type of computing device.

The vehicle system 123 may include hardware or software to enable the vehicle system to wirelessly access the network 105. For example, the vehicle system 123 may include an infotainment system to provide network services to a user of the vehicle system 123. The vehicle system 123 may receive services via the network 105. The infotainment system of the vehicle system 123 may use the services to provide one or more services to the user.

In some embodiments, the vehicle system 123 may include one or more sensors (not shown), such as a navigation sensor (e.g., a GPS sensor), an infrared detector, a motion detector, a thermostat, a sound detector, and any other type of sensors. For example, the vehicle system 123 may include sensors for measuring one or more of a current time, a current location (e.g., a latitude, longitude, and altitude of a location), an acceleration of the vehicle system 123, a velocity of the vehicle system 123, a fuel tank level of the vehicle system 123, a battery level of the vehicle system 123, an activity of an occupant of the vehicle system 123, etc. The sensors of the vehicle system 123 may include an interior cabin camera, weight sensor, carbon monoxide sensor or any other sensor to detect the activity of the occupant of the vehicle system 123. The sensors of the vehicle system 123 may include a buffer or some other non-transitory memory to store the network services requested by the user of the vehicle system 123.

As illustrated in FIG. 1, the vehicle system 123 includes a scheduler 197b and storage 127. The scheduler 197a is depicted with dashed lines in FIG. 1 in order to indicate that the scheduler 197a is optionally stored on the vehicle system 123. The schedule 197a is described above with reference to the mobile client system 188, and so, that description will not be repeated here.

The storage 127 can be a non-transitory storage medium that stores data for providing the functionality described herein. The storage 127 may be a dynamic random access memory (DRAM) device, a static random access memory (SRAM) device, flash memory, or some other memory devices. In some embodiments, the storage 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The social network server 101 can be a hardware server that includes a processor, a memory, and network communication capabilities. The social network server 101 sends and receives data to and from other entities of the system 100 via the network 105. The social network server 101 includes a social network application 111. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 101 and the social network application 111 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

In some embodiments, the scheduler 197 sends a request to the social network application 111 for crowd-sourced cloud data that are used to update the services for the current journey. For example, the scheduler 197 uses a link on a social network application 111 to find a source for streaming music with a lower bandwidth requirement than the streaming application currently being managed by the scheduler 197.

The content server 107 can be a hardware server that includes a processor, a memory, and network communication capabilities. The content server 107 may send and receive data to and from other entities of the system 100 via the network 105. In some embodiments, the content server 107 may provide various services to the vehicle system 123 or the mobile client system 188. For example, the content server 107 may provide one or more of the services described above. In some embodiments, the content server 107 sends the services data to the vehicle system 123 or the mobile client system 188. In some embodiments, the content server 107 sends services data to the mobile client system 188, causing the mobile client system 188 to forward the digital data to the vehicle system 123.

The second server 177 can be a hardware server that includes a processor, a memory, and network communication capabilities. The second server 177 sends and receives data to and from other entities of the system 100 via the network 105. For example, the second server 177 sends data describing a user's calendar to the mobile client system 188 with permission from the user. The second server 177 may provide any of the services described above.

In some embodiments, the second server 177 may include code and routines for providing a weather service to the vehicle system 123 or the mobile client system 188. For example, the second server 177 provides weather data that describes a current weather condition for a geographic area or an estimate of a future weather condition for the geographic area. The weather data indicate real-time weather conditions. In some embodiments, the weather data indicates a storm advisory or any other similar weather advisory.

In some embodiments, the second server 177 may include code and routines for providing a traffic advisory service to the vehicle system 123 or the mobile client system 188. The traffic advisory service may provide traffic advisory data describing a traffic condition along a roadway for a geographic area.

The traffic condition may be a dynamic condition or a static condition. An example of a dynamic traffic condition may include traffic congestion, a traffic accident, an animal or other obstacle along a roadway, or any other condition that may change within 1 to 24 hours of the traffic advisory data being transmitted by the second server 177 to the vehicle system 123 or the mobile client system 188 via the network 105. Dynamic traffic conditions may also include a speed trap, DUI inspection point, or any other condition caused by law enforcement activity along a roadway.

A static traffic condition may include any traffic condition that may not change within 24 hours of the traffic advisory data being transmitted by the second server 177 to the vehicle system 123 or the mobile client system 188 via the network 105. A static traffic condition may include a portion of a roadway with a history of high instances of traffic accidents, traffic citations among motorists, poor drivability for current weather conditions, or any or any other traffic condition that may not change within 24 hours of the traffic advisory data being transmitted by the second server 177 to the vehicle system 123 or the mobile client system 188 via the network 105.

In some embodiments, the second server 177 may provide mapping services to the user. For example, the second server 177 may generate a map and directions for the user. In one embodiment, the scheduler 197 receives a request for directions from a user 125 to travel from point A to point B and transmits the request to the second server 177. The second server 177 generates directions and a map and transmits the directions and map to the scheduler 197 for display to the user.

In the embodiments described above, the code and routines of the second server may be stored on a memory of the second server 177 or executed by a processor of the second server 177.

Example Scheduler

Figure 2:
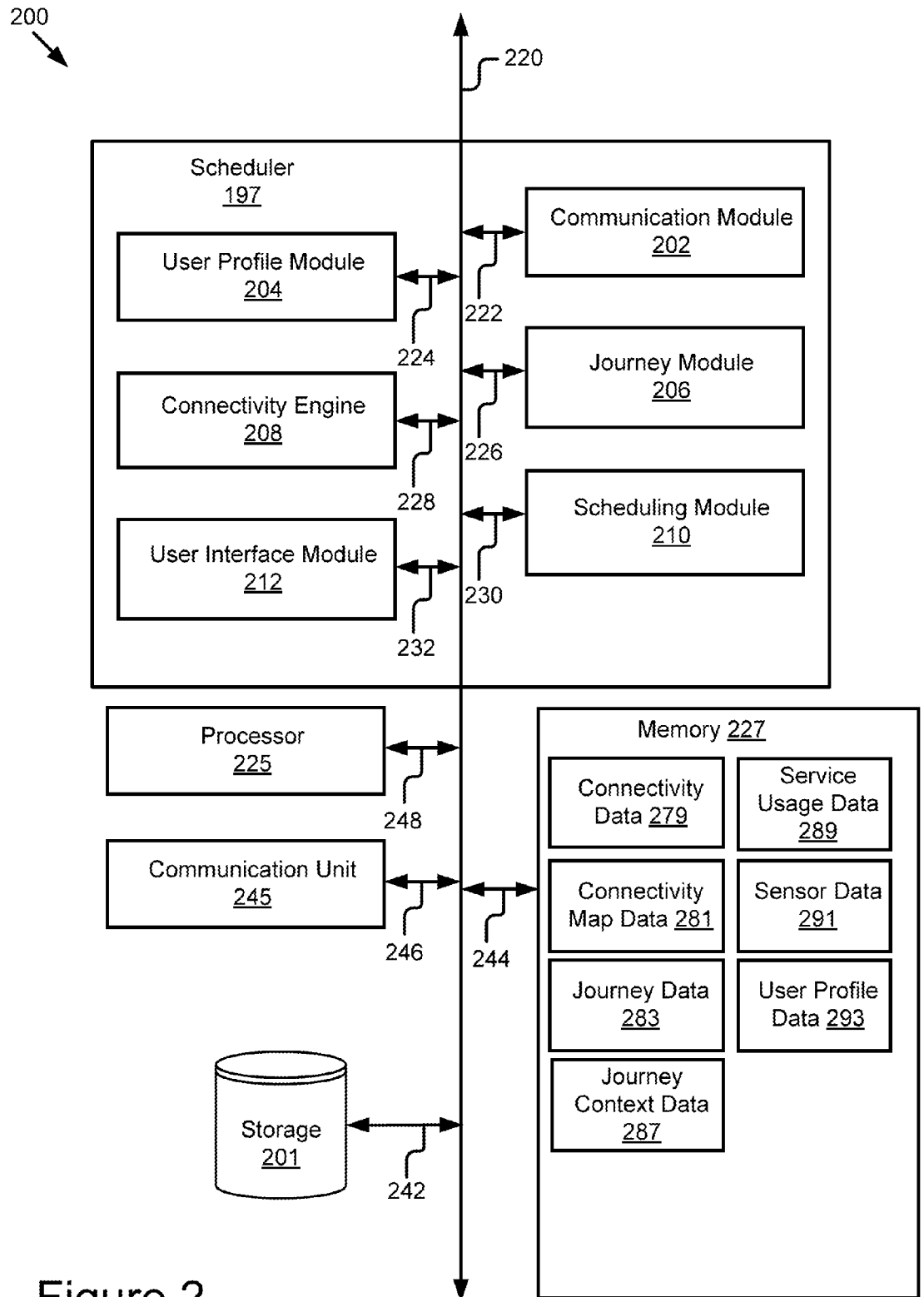
FIG. 2 is a block diagram illustrating an example system that includes an example scheduler.

Referring now to FIG. 2, an example of the scheduler 197 is shown in more detail. FIG. 2 is a block diagram of a system 200. The system 200 may be the vehicle system 123, the mobile client system 188 or one of the servers 101, 107, 177 of the system 100. The system 200 includes the scheduler 197, a processor 225, a communication unit 245, the storage 201, a memory 227, and a sniffer 299 according to some examples. The components of the system 200 are communicatively coupled by a bus 220.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some embodiments, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores connectivity data 279, connectivity map data 281, journey data 283, journey context data 287, service usage data 289, sensor data 291, and user profile data 293. The memory 227 may also store other data for providing the functionality described herein.

The connectivity data 279 may include, but is not limited to, data describing connectivity, such as in the form of a connectivity log, and location associated with connectivity, such as a connectivity index. In some embodiments, the connectivity data 279 is frequently updated with new connectivity information.

The connectivity map data 281 may include, but is not limited to, digital data describing the mobile network coverage area and one or more dead zones for a geographic area. For example, the connectivity map data 281 describes the availability of one or more mobile data networks in a geographic area. In one implementation, the connectivity map data 281 may describe the mobile network coverage area and one or more dead zones along the roadways of a geographic area. In some embodiments, the connectivity engine 208 converts the connectivity data 279 into a connectivity map data 281. The connectivity map data 281 may be used to generate an overall connectivity map that describes connectivity in a certain broad location, e.g. the United States.

The connectivity map data 281 may be used with the journey data 283 to generate a current connectivity map that describes the connectivity associated with a particular journey. For example, the connectivity map data 281 may include information describing the mobile network coverage area and one or more dead zones along the roadways of a geographic area associated with a journey start point, destination or a route for traveling from a start point to a destination. In this way, the scheduler 197 may beneficially modify the connectivity map data 281 to include relevant information from the journey data 283 so that the scheduler 197 may perform more computationally efficient operations.

In some embodiments, the connectivity map data 281 include time synchronicity data that is used to define a universal time among a network system including any combination of one or more vehicle systems 123 or one or more mobile client systems 188. For example, the availability or strength of one or more mobile data networks for a particular geographic area may change over time. The connectivity map data 281 may describe the availability or strength of one or more mobile data networks for a particular geographic area over various times. In this way, the combination of the connectivity map data 281 and the time synchronicity data may indicate the historic availability and strength of a mobile network for a particular geographic area at various times of day. For example, the connectivity map data 281 and the time synchronicity data may be combined to predict the availability and strength of a mobile data network along a roadway in a geographic area for a particular time of day.

The journey data 283 may include historical journey data. This historical journey data may be associated with a user of the vehicle system 123 or the mobile client system 188. The historical journey data may include data describing information such as routes, start points, destinations, durations, departure times, arrival times, directions, etc. associated with historical journeys. For example, the journey data 283 may include a log of all locations visited by the vehicle system 123, mobile client system 188 or a user of both the vehicle system 123 and the mobile client system 188 (e.g. locations associated with both the vehicle system 123 and the mobile client system 188 having a common user). The journey data 283 may describe locations requested by the user via a navigation system of the vehicle system 123 or mobile client system 188.

The journey data 283 may include information describing one or more users associated with the vehicle system 123 (e.g., a driver in a vehicle, a passenger in the vehicle), historical journey data associated with a user operating the vehicle (e.g., start points, destinations, durations, routes associated with historical journeys), and other vehicle data associated with the vehicle system 123.

In some embodiments, the journey data 283 includes time synchronicity data or be associated with the time synchronicity data. The time synchronicity data may include information describing a universal time shared among one or more systems associated with the network 105 of FIG. 1. The time synchronicity data may be data used to synchronize a system time with a universal time. For example, the time synchronicity data can be configured to synchronize a local time associated with a vehicle system 123 or a mobile client system 188 with a universal time. For example, the time synchronicity data may describe one or more times associated with one or more historic journeys described by the journey data 283. In some embodiments, the time synchronicity data may indicate that a particular user has a pattern of taking a particular journey at a particular time of day for a given day of the week. For example, the combination of the time synchronicity data and the journey data 283 may indicates that a user has a pattern of beginning a commute to work at 7:00 PM on most weekdays (Monday through Friday).

The journey data 283 may be associated with a user of the vehicle system 123 or the mobile client device 188. For example, the journey data 283 may be specific to a particular user of the vehicle system 123 or the mobile client device 188. In this way, the journey data 283 may be distinguished from navigation map data used to provide GPS coordinates or navigation instructions by a navigation system. For example, the same navigation map data may be used to provide GPS coordinates or navigation instructions for any user of the vehicle system 123 or the mobile client device 188. By contrast, the journey data 283 may describe historic journeys for a particular user and include time synchronicity data, journey context data 287 or connectivity map data 281 describing one or more historic journeys of the user.

The journey context data 287 may include information indicating why some journeys happen at a particular time. The journey context data 287 may also indicate why some journeys fail to happen at a particular time when the journey may have otherwise occurred. For example, the combination of the time synchronicity data 285, the journey data 283 and the journey context data 287 may indicate that a user has a pattern of beginning a commute to work at 7:00 AM on most weekdays (Monday through Friday) with the exception that the user does not take this journey when the weekday is a holiday such as Christmas or the Fourth of July. In this example, the journey context data 287 may provide context information to describe one or more exceptions to the pattern indicated by the journey data 283 and the time synchronicity data.

In some embodiments, journey context data 287 includes weather data associated with a journey. For example, the combination of the time synchronicity data and the journey data 283 may indicate that that a user has the following pattern: (1) departing for work at 7:00 AM on most weekdays (Monday through Friday); and (2) arriving at work at 7:30 AM on these days. The journey context data 287 may indicate that the user breaks this pattern for certain weather conditions. For example, the journey context data 287 may indicate that the user arrives at work at 7:45 AM when the weather conditions include rain or 8:00 AM when the weather conditions include snow or ice. The journey context data 287 may provide context information to describe one or more exceptions to the pattern indicated by the journey data 283 and the time synchronicity data. For example, the user may be on the roadway for different times because of the weather conditions (instead of being on the roadway from 7:00 AM to 7:30 AM, the user is on the roadway from 7:00 AM to 7:45 AM or 8:00 AM depending on the type of weather condition present). Because the user is on the roadway for different times, and because the availability or strength of mobile data networks may be different for different times or different weather conditions, the connectivity map data 281 for a journey affected by weather may be different than a similar journey that is not affected by weather. Other examples of journey context data 287 are possible.

The service usage data 289 may include information about a user's consumption of services during a journey. The service usage data 289 may include the type of service and, in conjunction with time synchronicity data, how long the service was used. For example, during a four hour journey the user streamed internet music for the entire trip, an email application pinged for new messages every five minutes, and the user made a 21 minute phone call. In some embodiments, the service usage data 289 may include a priority and an urgency. The urgency may be based on a location, and/or a service deadline. For example, where the service is a traffic update, the urgency increases as the vehicle system 123 approaches the location of the update and not urgent once the vehicle system passes the location.

The sensor data 291 may include information from the vehicle system 123. The sensor data 291 may include vehicle sensor data and current network sensor data. For example, vehicle sensor data includes speed and location of the vehicle in the vehicle system 123. The current network sensor data includes, for example newer information than the historical sensor data used to generate the overall connectivity map.

The user profile data 293 may include information about a user. For example, the user profile data 293 may include user preferences, such as services that the user has indicated have a high priority or a low priority. The user preferences can be provided at registration and updated at any time. For example, where the user is expecting an important email, the priority of an email application can be marked as high or the services can be associated with a certain urgency during a trip. In some embodiments, the user preferences can be ranked as a series of preferences. For example, the user indicates that a map application has a higher priority than a streaming music application, which has a higher priority than an email application.

In one embodiment, the scheduler 197 includes functionality to learn the habits of the user and automatically generate a ranked list of the user's preferences. For example, the scheduling 197 includes a learning module (not pictured). The learning module includes code and routines configured to monitor which services the user consumes during different journeys. The learning module may identify patterns the way the user consumes services during journeys. The patterns identified by the learning module may be enhanced using time synchronicity data. For example, the learning module may estimate, based on the user's pattern of behavior or explicit inputs received from the user, that: (1) when the user commutes to work at their regular time, they prefer to listen to news; and (2) when the user commutes to work at a time that is later than their regular, they prefer navigation instructions for the quickest way to work based on real-time traffic and calendar information showing their next appointments. In other words, the learning module can learn the time when the user regularly commutes to work, what services the user prefers to consume when commuting to work at their regular time, and that when the user is running late for work, they prefer information that will help get them to work sooner and let them know of any appointments that may need to be rescheduled.

The learning module may learn any habits or preferences of the user. For example, the learning module may learn which services the user prefers to consume at different times of the day and for different journeys. The learning module may also learn about the user's habits based on the user's social network profile associated with the social network application.

In some embodiments, the learning module crowdsources information about the user from one or more of the social network server 101, content server 107 or the second server 177. In some embodiments, learning module analyses the user's interactions with network services and determines the user's habits and preferences of the user. For example, the learning module analyses the user's interactions with network services including navigation instructions, streaming audio or video (such as Pandora™, Spotify™, iTunes™, Google Play™, YouTube™, etc), social networking (such as FaceBook™, Google+™, LinkedIn™, Tinder™, QQ™, etc.), microblogging (such as Twitter™, Tumblr™), online chatting (such as SnapChat™, WhatsApp™, etc.), online content sharing (such as Instagram™, Pinterest™, etc.), email (such as Gmail™, Outlook™, Yahoo Mail™, etc.), file sharing (such as DropBox™, Google Drive™, MS One Drive™, Evernote™, etc), calendar and scheduling (such as Google™ Calendar, MS Outlook™, etc.), etc. Based on this analysis, the learning module may learn the habits or preferences of the user.

The learning module may estimate a ranked list of the services the user prefers to consume during different journeys. The ranked list may be stored in the user profile data 293. The ranked list may be associated with time synchronicity data so that the ranked list indicates the user's preferences for different times of day, days of the week, holidays, etc. Later, when the user begins a new journey, the scheduler 197 may retrieve the ranked list and estimate what journey the user is currently taking and the services the user is estimated to consume during the journey.

The learning module may include functionality to determine which user is using the scheduler 197 at any given time so that the scheduler 197 may retrieve the appropriate list. For example, the learning module is an element of a vehicle system 123 that includes interior cameras. The interior cameras capture an image of the person driving the vehicle system 123. The learning module includes functionality to determine the identity of the driver. The learning module uses the identity information to retrieve the user preferences list that corresponds with the identity of the driver. The identity of the user may be determined in other ways. For example, the user may log in using security credentials or a fingerprint scanner.

The communication unit 245 transmits and receives data to and from at least one of the vehicle system 123, the mobile client system 188, and the servers 101, 107, 177 in the system 100. The communication unit 245 is coupled to the bus 220 via a signal line 246. In some embodiments, the communication unit 245 includes a port for direct physical connection to the network 105 or to another communication channel. For example, the communication unit 245 includes a USB, SD, CAT-5, or similar port for wired communication with other entities in the system 100. In some embodiments, the communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some embodiments, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage 201 stores instructions or data that may be executed by the processor 225. The storage 201 may be a buffer used by the system 200 to provide its functionality. In some embodiments, the storage 201 includes pre-fetched and retrieved services. The storage 201 is coupled to the bus 220 for communication with the other components via a signal line 242. The instructions or data stored on the storage 201 may include code for performing the techniques described herein. The storage 201 may be a dynamic random access memory (DRAM) device, a static random access memory (SRAM) device, flash memory, or some other memory device. In some embodiments, the storage 201 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The sniffer 299 may be a packet analyzer. The sniffer 299 may be a packet analyzer for scanning and detecting the presence of a wireless network. For example, the sniffer 299 may be a packet analyzer for scanning and detecting the presence of a mobile network signal. In some embodiments, the sniffer 299 is software, hardware or a combination of hardware and software. For example, the sniffer is code and routines stored on the storage 201 or the memory 227 and executable by the processor 225. The sniffer 299 may be a wireless sniffer. The sniffer 299 may include hardware components such as an antenna or a packet capture appliance.

The sniffer 299 may be configured to detect the presence of a mobile network in a geographic region. For example, the sniffer 299 may be configured to detect the presence of a mobile network along a roadway. The sniffer 299 may also be configured to detect a dead zone along a roadway. The sniffer 299 may be configured to detect one or more mobile networks such as those described above with reference to network 105 of FIG. 1. The sniffer 299 may include functionality to intercept and log traffic on a mobile network detected by the sniffer 299. The sniffer 299 may store data describing the traffic on the storage 201 or the memory 227. In some embodiments, the sniffer 299 includes functionality to determine the type of mobile network detected by the sniffer 299. For example, the sniffer 299 may be able to discern the difference between the signal for a Bluetooth® network and the signal for a 4G network. In some embodiments, the sniffer 299 includes functionality to determine the strength of the signal associated with the mobile network. The sniffer 299 may include other functionality not described here.

The sniffer 299 may be communicatively coupled to the bus 220 via signal line 245. The sniffer 299 may transmit digital data describing the mobile network coverage area and one or more dead zones for a geographic area to the communication unit 245. The communication unit 245 may transmit this digital data to one or more modules 202, 204, 206, 208, 210, 212 of the scheduler 197.

In the illustrated implementation shown in FIG. 2, the scheduler 197 includes a communication module 202, a user profile module 204, a journey module 206, a connectivity engine 208, a scheduling module 210, and a user interface module 212. These modules of the scheduler 197 are communicatively coupled to each other via the bus 220.

In some embodiments, modules of the scheduler 197 can be stored in a single server or device. In some other embodiments, modules of the scheduler 197 can be distributed and stored across multiple servers or devices. Furthermore, the separation of various components, modules, and servers in the embodiments described herein should not be understood as requiring such separation in all embodiments. In some embodiments, the described components, modules, devices, or servers can generally be integrated together in a single component, module, device, or server.

In some embodiments, each of the modules 202, 204, 206, 208, 210, and 212 in the scheduler 197 can be a set of instructions executable by the processor 225 to provide the functionality described below. In some other embodiments, each of the modules 202, 204, 206, 208, 210, and 212 can be stored in the memory 227 and can be accessible and executable by the processor 225 of the system. Each of the modules 202, 204, 206, 208, 210, and 212 may be adapted for cooperation and communication with the processor 225 and other components of the system 200. In some embodiments, each of the modules 202, 204, 206, 208, 210, and 212 may be adapted to function as one or more thin clients that are stored and executed by a processor of the system 200.

The communication module 202 can be software including routines for handling communications between the scheduler 197 and other components of the system 200. The communication module 202 may be communicatively coupled to the bus 220 via a signal line 222. The communication module 202 sends and receives data, via the communication unit 245, to and from one or more of the vehicle system 123, the mobile client system 188, the social network server 101, the content server 107, or the second server 177. For example, the communication module 202 receives, via the communication unit 245, a traffic update from the second server 177 and sends the traffic update to the memory 227.

In some embodiments, the communication module 202 receives data from components of the map module 197 and stores the data in one or more of the storage 201 or the memory 227. In some embodiments, the communication module 202 retrieves data from the storage 201 or the memory 227 and sends the data to one or more components of the scheduler 197. In some embodiments, the communication module 202 may handle communications between components of the scheduler 197. For example, the communication module 202 receives data from one module of and sends the data to another module.

The user profile module 204 can be software including routines for generating a user profile for a user that includes user references. The user profile module 204 may be communicatively coupled to the bus 220 via a signal line 224.

In some embodiments, the user profile module 204 registers users and generates user profile data 293. The user profile data may include a unique identifier for the user, login information (username, password, email, recovery email, phone number, demographic information, etc.), and user preferences. The user preferences may include the user's ranking of priority for the services. For example, the user may prefer to receive phone calls above all other services.

The journey module 206 can be software including routines for determining a journey and generating journey data 283. The journey module 206 may be communicatively coupled to the bus 220 via a signal line 226.

The journey module 206 generates journey data 283 for a user. For example, a user requests directions for a journey from point A to point B. In some embodiments the journey module 206 generates directions for the user. In other embodiments the journey module 206 requests directions from the second server 177. The journey module 206 may transmit instructions to the user interface module 212 to generate graphical data of the journey data 283, such as a map.

In one example, the journey module 206 may estimate a route associated with a future journey for the user. The journey module 206 may determine location-based digital data for the vehicle that includes road construction information along the estimated route that was received from the second server 177. The journey module 206 saves the data as journey context data 287 in the memory 227. The journey module 206 stores the location-based digital data in the mobile client system 188 before the start of the journey. At the time of travel, if the user drives the vehicle along the estimated route, the journey module 206 determines that the location-based digital data is still valid. In this case, the location-based digital data may be transmitted from the mobile client system 188 to the vehicle. However, if the user does not drive along the estimated route, the journey module 206 determines that the location-based digital data is invalid. In this case, the location-based digital data may not be transmitted to the vehicle.

The connectivity engine 208 can be software including routines for generating connectivity data 279 and connectivity map data 281. The connectivity engine 208 may be communicatively coupled to the bus 220 via a signal line 228. In some embodiments, the connectivity engine 208 scans for the presence of a wireless network and detects the presence of a wireless network signal associated with a wireless network. The connectivity engine 208 may communicate with the sniffer 299 via the communication unit 245 to scan for the presence of a wireless network and detect a wireless network signal. In some embodiments, the connectivity engine 208 scans for the presence of available network devices. For example, the connectivity engine 208 identifies network devices that will provide network services to the user.

The connectivity engine 208 generates connectivity data 279, such as a connectivity log. The connectivity engine 208 associates the connectivity data 279 with locations to generate connectivity map data 281. The connectivity map data 281 may include an overall map of a location, for example, a connectivity map of San Jose, California or California. The connectivity map data 281 may also receive journey data 283 from the journey module 206 and generate a current connectivity map that includes the connectivity associated with the user's journey.

In some embodiments, the connectivity engine 208 communicates with the sniffer 299 to determine network strength associated with the connectivity data 279. This is also known as received signal strength indication (RSSI). For example, the connectivity engine 208 determines that a wireless signal is very strong in one location and there is a dead zone of connectivity in another location.

In some embodiments, the connectivity engine 208 generates the current connectivity map from the overall connectivity map based on driving-related data. The driving-related data includes, for example, a connectivity forecast for a current journey and a historical connectivity index. The connectivity forecast is a prediction of the connectivity during the journey. The historical connectivity index is a log of all the instances where connectivity was recorded.

In some embodiments, the connectivity engine 208 generates a current connectivity map from the overall connectivity map and modifies it with the RSSI, information about available network devices, user preferences, and journey data 283. The RSSI may be used to determine how to manage downloading of services. For example, where the scheduler 197 is in proximity to a strong signal for several minutes and then is about to enter a dead zone, the scheduling module 210 will modify the downloading of data to obtain more content before entering the dead zone. The user preferences include whether the user has expressed a preference for a type of network connectivity, such as WiFi over a 3G connection. The connectivity engine 208 uses the journey data 283 to determine the subset of the overall connectivity map that applies to the current connectivity map.

The connectivity engine 208 generates a real-time connectivity estimation based on sensor data 291. The sensor data 291 may include vehicle data, such as the speed and location of the vehicle system 123 and current network sensor data. The current network sensor data includes new information about sensor data, such as a new hotspot that was not included in the overall connectivity map. In some embodiments, the connectivity engine 208 characterizes the network, such as a good network, an average network, a bad network, or a characterization of the network as compared to a previous estimation (improved, the same, reduced, etc.). The connectivity engine 208 transmits the current connectivity map and the real-time connectivity estimation to the scheduling module 210.

The scheduling module 210 can be software including routines for generating a prioritized list of services, expiration time for the services, and updating the services for the current journey. The scheduling module 210 may be communicatively coupled to the bus 220 via a signal line 230.

The scheduling module 210 receives the current connectivity map and the real-time connectivity estimation from the connectivity engine 208 and estimates services for the current journey. In some embodiments, the connectivity engine 208 estimates the services based on journey data 283, user preferences, and journey context data 287. The journey data 283 is used to determine how long the journey will take. The user preferences include user input about the preferred services.

The journey context data 287 includes information about the services that the user prefers depending on the context. For example, the user enjoys listening to music from 5 pm to 6 pm after work. In another example, the user makes phone calls on trips that are longer than 20 miles. In yet another example, the user accesses a podcast application when it is raining outside. In some embodiments, the scheduling module 210 uses journey context data 287 customized for one or more users that are likely to participate in the estimated future journey. For example, if the journey context data 287 indicates that a child will be onboard in the vehicle during the estimated journey, the digital data may include the child's favorite cartoons. Example content data includes, but is not limited to, videos, movies, audio books, TV shows, podcasts, and music, etc.

The scheduling module 210 generates a prioritized list of services. In some embodiments, the scheduling module 210 generates the prioritized list of services based on priorities and the urgency of the service. The urgency of the service may be based on location or service deadlines. In one example, the location is used by a traffic application to notify the user of an accident. As the vehicle system 123 approaches the accident, the urgency of the service increases. Once the vehicle system 123 passes the accident, the information is no longer urgent. The service deadline captures the time sensitivity of the content. These values are specified either by the application type, or derived from the user preferences. For example, automated speech recognition has high urgency, since speech application responses should occur in less than a second. Map updates may have high priority, but low urgency, since the data does not change frequently and can be pre-fetched. In some embodiments, the deadline is based on an expiration time. In some embodiments, the list of priorities and expiration times may be based on at least one of local real-time connectivity information generated from radio receivers, an estimation of local connectivity information generated from radio receiver data about real-time measurement of available bandwidth, and crowd-sourced cloud data.

The time-sensitive digital data may expire after the expiration time. For example, the time-sensitive digital data includes time-sensitive deals for stores or restaurants along the estimated route of the future journey, where the time-sensitive deals are valid at least during a time period between the estimated departure time and the estimated arrival time. In another example, the priorities and urgency of the information may include software program updates for updating one or more software programs installed in the vehicle.

In some embodiments, the scheduling module 210 caches pre-fetched and retrieved content. For example, the scheduling module 210 caches the map associated with the journey so that during dead zones in network connectivity, the user may still access directions. The scheduling module 210 may use historical actions to determine what to pre-fetch and retrieve. For example, where the user frequently listens to a particular internet radio station, the scheduling module 210 stores some of the content in the storage 201.

The scheduling module 210 may update services for the current journey. The scheduling module 210 performs the update when circumstances change. For example, the scheduling module 210 updates services based on actual services requested, a real-time measurement of bandwidth, or crowd-sourced cloud data. The change in actual services being requested includes, for example, a user requesting a new service, such as opening a recipe application on a mobile device that needs internet access to function. The real-time measurement of bandwidth includes information that was not available on the overall connectivity map, such as when a new wireless tower is installed. The crowd-sourced cloud data includes information about services consumed by people with similar demographics. For example, users travelling in San Francisco are more likely to use a traffic application than streaming radio because of construction and car accidents. The scheduling module 210 receives the crowd-sourced cloud data from the social network application 111.

The scheduling module 210 determines whether the current journey has ended. For example, the scheduling module 210 determines based on the journey data 283 whether the vehicle system 123 is at the end of the journey. If the current journey continues, the connectivity engine 208 updates the current connectivity map based on the vehicle system's 123 new location.

The user interface module 212 can be software including routines for generating graphical data for providing user interfaces. The user interface module 212 may be communicatively coupled to the bus 220 via a signal line 232. In some embodiments, the user interface module 212 generates graphical data for providing a user interface that allows a user to input data via the user interface. For example, the user inputs preferences about the priority of different services. The user interface module 212 sends the graphical data to a display coupled to the mobile client system 188 or the vehicle system 123 for presenting the user interface to the user. The user interface module 212 may generate graphical data for providing other user interfaces to the user.

Example User Interface

Figure 3:
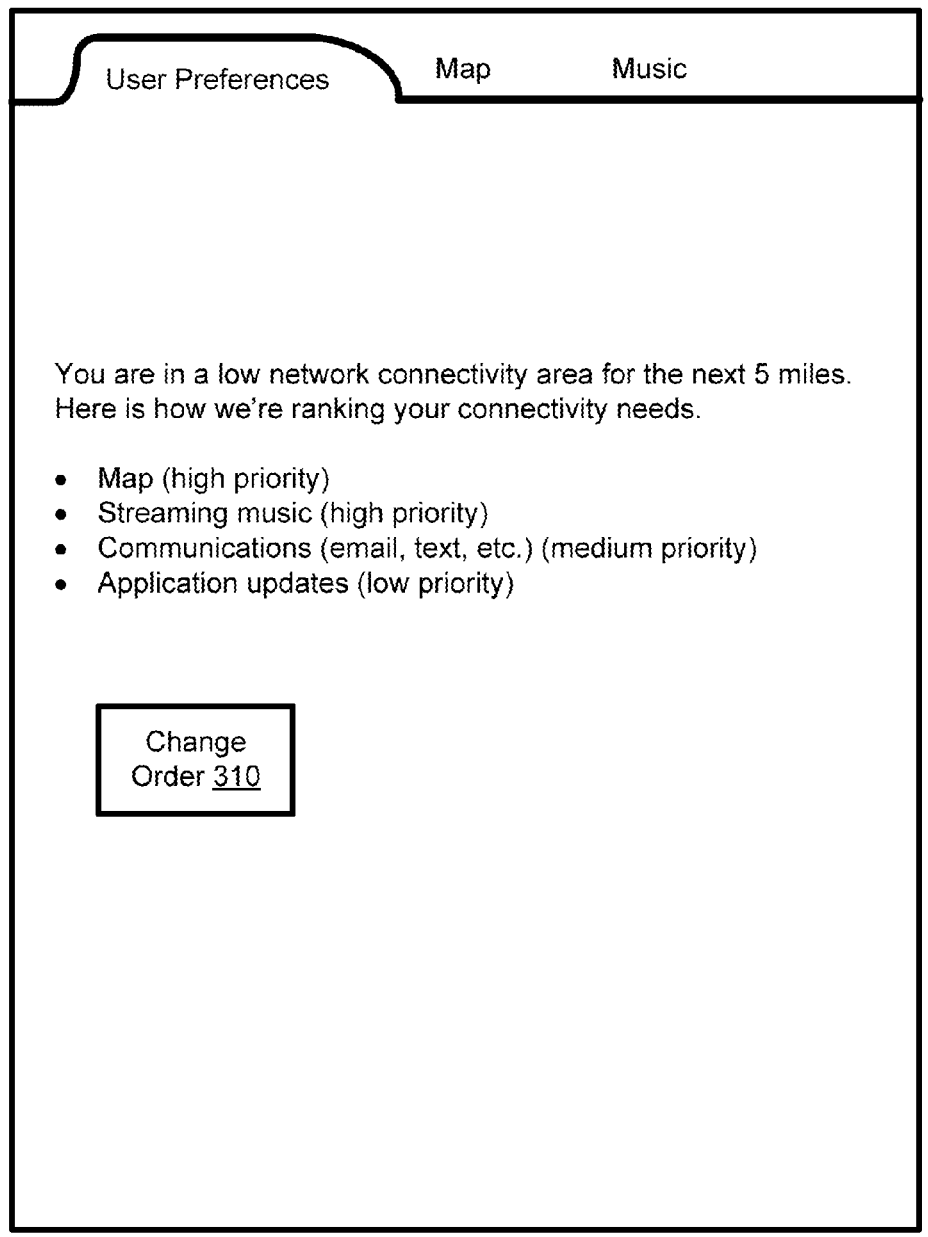
FIG. 3 is a block diagram illustrating an example user interface that includes the prioritized services.

Referring now to FIG. 3, an example user interface 300 is illustrated. In this example, the user interface is divided into three sections: a user interface for user preferences, a user interface for a map application, and a user interface for a music application. The user interface for user preferences includes a warning that the user is about to enter a zone with low connectivity for the next five miles and lists the priority associated with each service. If the user wants to change the priority associated with each service, the user may select the "change order" button 310. Selecting the "change order" button 310 may cause a drop-down box to be displayed next to each priority where the user may alter the priority. Persons of ordinary skill in the art will recognize that a variety of user interfaces for specifying the priority are possible.

Example Methods

Figure 4:
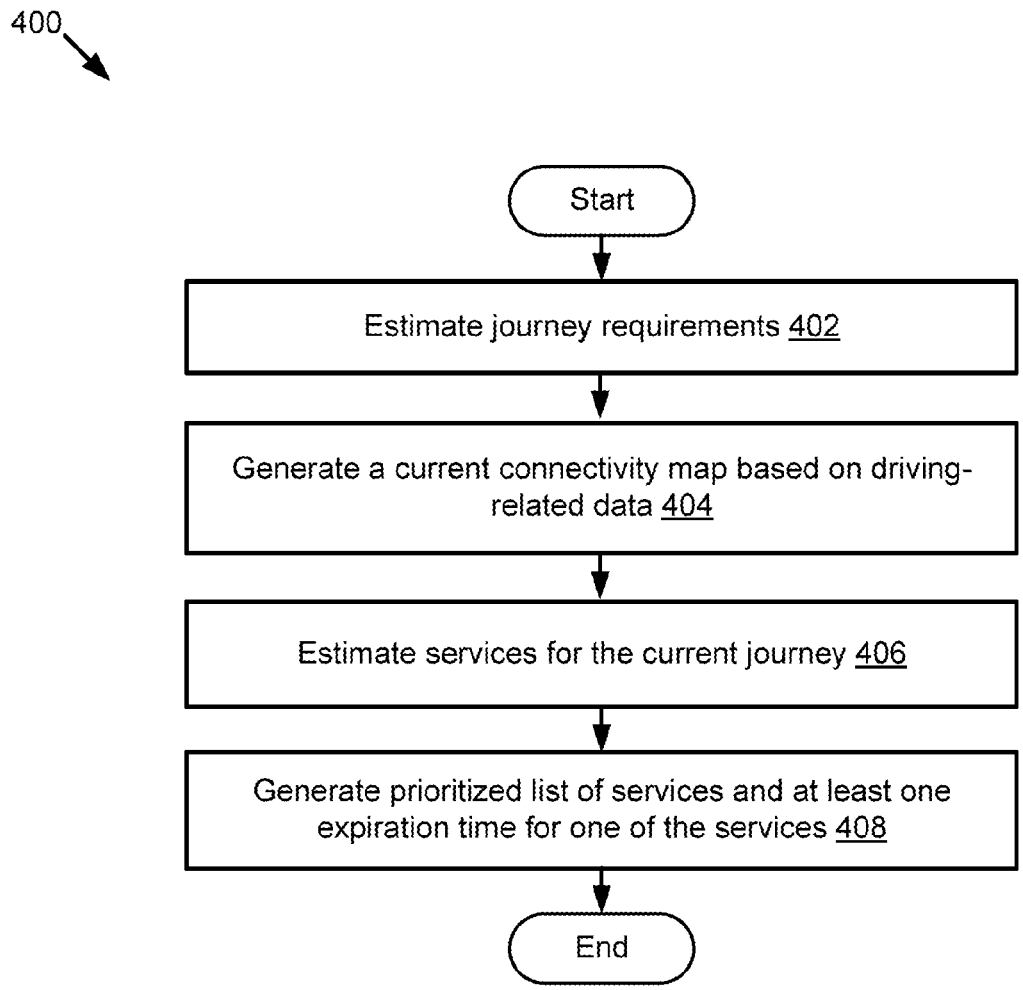
FIG. 4 is a flowchart of an example method for provisioning wireless application services in sparsely connected wireless environments.

Referring now to FIG. 4, an example of a method 400 for provisioning wireless application services in sparsely connected wireless environments is described. In some embodiments, the method 400 may be performed by modules of the scheduler 197 stored on the mobile client system 188 or the vehicle system 123. For example, the scheduler 197 may include a journey module 206, a connectivity engine 208, and a scheduling module 210.

The journey module 206 estimates 402 journey requirements. For example, the journey module 206 determines directions for the user from point A to point B. The connectivity engine 208 generates 404 a current connectivity map based on driving-related data. The scheduling module 210 estimates 406 services for the current journey and generates 408 a prioritized list of services and expiration times for the services. The expiration times include, for example, a notification that expires when the user passes a particular location, such as a notification of a last gas station for five miles.

Figure 5A:
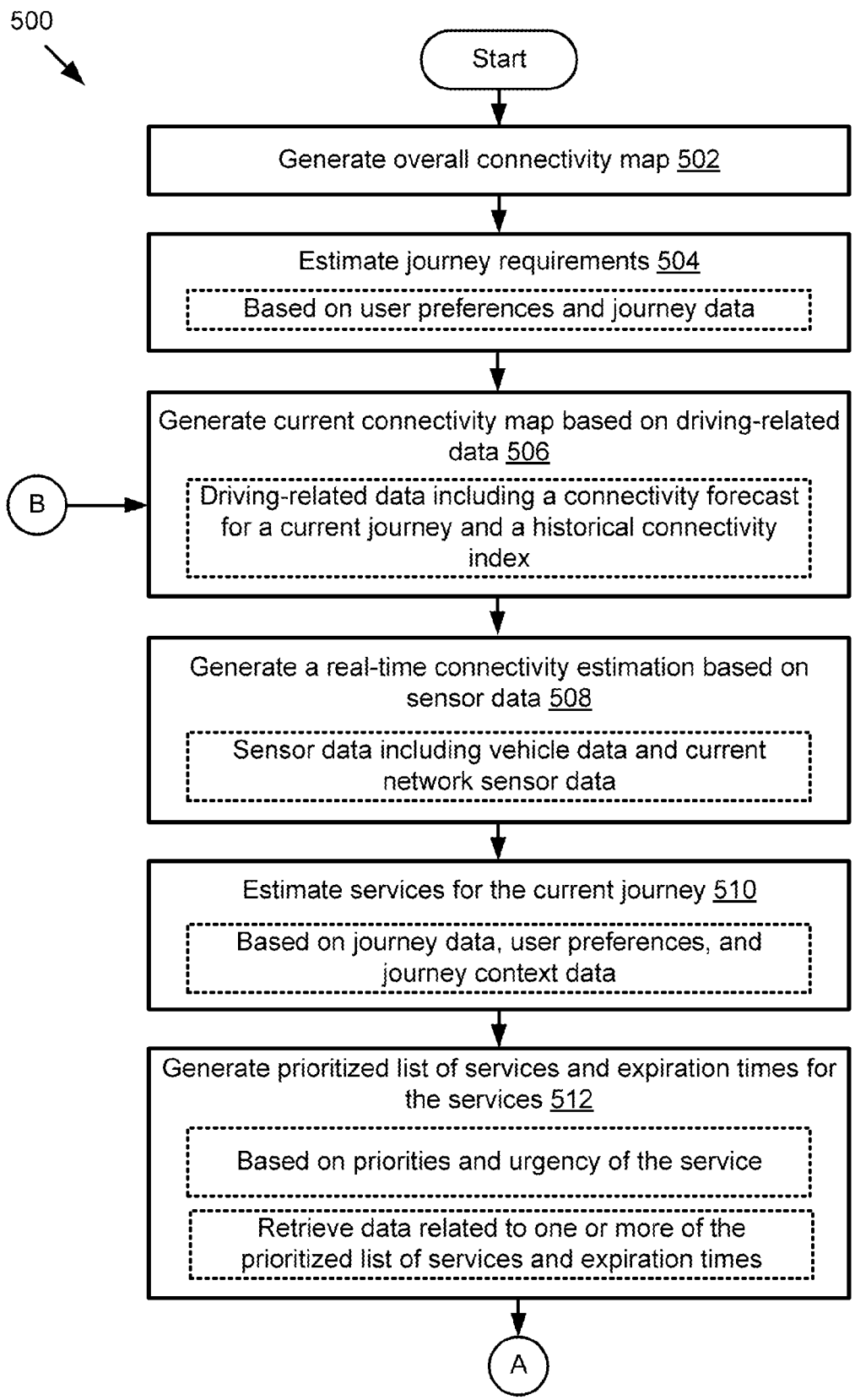
FIGS. 5A and 5B are flowcharts of another example method for provisioning wireless application services in sparsely connected wireless environments.
Figure 5B:
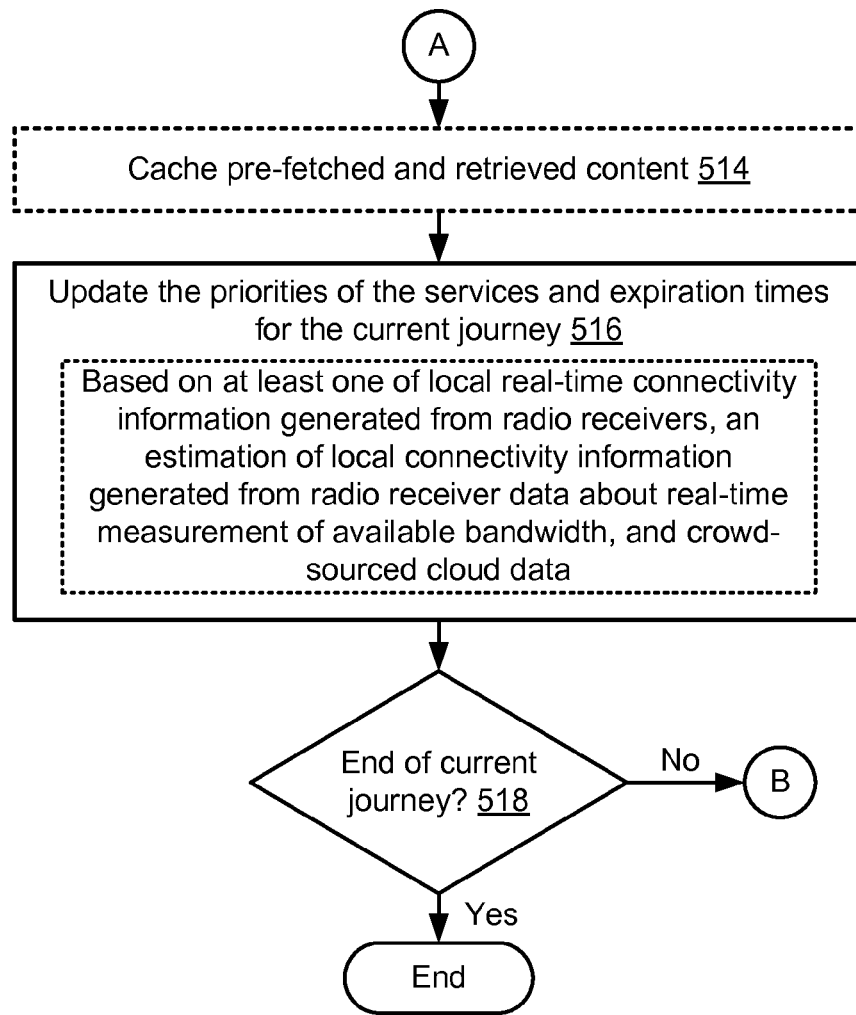

FIGS. 5A and 5B are flowcharts of another example method 500 for provisioning wireless application services in sparsely connected wireless environments. In some embodiments, the method 400 may be performed by modules of the scheduler 197 stored on the mobile client system 188 or the vehicle system 123. For example, the scheduler 197 may include a user profile module 204, a journey module 206, a connectivity engine 208, and a scheduling module 210.

Referring to FIG. 5A, the connectivity engine 208 generates 502 an overall connectivity map. For example, the overall connectivity map is for a large region, such as Wyoming or the United States. The journey module 206 estimates 504 journey requirements. In some embodiments, the journey requirements are based on user preferences generated by the user profile module 204 and journey data 283 generated by the journey module 206. The connectivity engine 208 generates 506 a current connectivity map based on driving related data. The driving-related data includes, for example, a connectivity forecast for a current journey and a historical connectivity index. The connectivity engine 208 generates 508 a real-time connectivity estimation based on sensor data. The sensor data includes, for example, vehicle data and network sensor data. Vehicle data is used to determine the length of time that the vehicle system 123 will spend at a particular location. For example, the vehicle data includes speed and location, which is used in conjunction with the network sensor data to determine that the vehicle 123 is expected to spend five minutes in a high connectivity area, etc.

The scheduling module 210 estimates 510 services for the current journey. For example, the estimation is based on journey data 283, user preferences, and journey context data 287. Journey data 283 includes the map of the user's journey. User preferences include, for example, that the user has indicated certain services as being high priority. Journey context data 287 includes information about which services the user consumes during a certain context. The scheduling module 210 generates 512 a prioritized list of services and expiration times for the services. The list may be based on priorities and urgency of the service.

Referring to FIG. 5B, in some embodiments the scheduling module 210 caches pre-fetched and retrieved content. For example, based on the journey context data 287 the user always plays a particular television show for the user's baby. As a result, the scheduling module 210 may download the television show ahead of time. The scheduling module 210 updates 516 the priorities of services and expiration times for the current journey. For example, the updating may be based on at least one of local real-time connectivity information generated from radio receivers, an estimation of local connectivity information generated from radio receiver data about real-time measurement of available bandwidth, crowd-sourced cloud data.

The scheduling module 210 determines 518 whether the current journey ended. If so, the method ends. If not, the connectivity engine 208 begins step 506 and continues the method until the current journey has ended.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   estimating journey requirements for a vehicle;
   generating a current connectivity map based on driving-related data;
   generating a real-time connectivity estimation;
   estimating services for a current journey of the vehicle based on the current connectivity map, the real-time connectivity estimation, and an estimated route for the current journey, wherein the services include a time-sensitive deal and a map application update;
   generating a prioritized list of services for the current journey of the vehicle based on one or more service deadlines of one or more of the services, wherein a service deadline of the time-sensitive deal is based on an expiration of the time-sensitive deal; and
   updating one or more map applications installed in the vehicle with the map application update based on the current connectivity map indicating that the vehicle is about to enter a geographic area having limited connectivity to a mobile data network.

2. The method of claim 1, further comprising updating the prioritized list of services for the current journey based on at least one of actual services requested, real-time measurement of available bandwidth, and crowd-sourced cloud data.

3. The method of claim 2, further comprising determining whether the current journey has ended and, responsive to the current journey continuing, continuing to generate the connectivity map based on driving-related data until the current journey ends.

4. The method of claim 1, further comprising caching pre-fetched content and retrieved content that are associated with the services, wherein the pre-fetched content and the retrieved content include a geographic map and corresponding driving directions associated with the current journey.

5. The method of claim 1, wherein the journey requirements are based on user preferences that include a user-provided ranking of priorities for each of the services.

6. The method of claim 1, wherein the driving-related data includes a connectivity forecast for the current journey and a historical connectivity index.

7. The method of claim 1, wherein the vehicle is an autonomous vehicle that is a robot.

8. The method of claim 1, wherein the vehicle includes generating circuitry and estimating circuitry that are elements of a computing device in the vehicle.

9. The method of claim 1, wherein:
   the services include a traffic update,
   the prioritized list of services is further based on an urgency of one or more of the services, and
   the urgency of the traffic update is based on a location of an accident.

10. The method of claim 1, wherein one or more of the services occurs at a store or a restaurant along the estimated route and the time-sensitive deal occurs at the store or the restaurant.

11. A computer program product comprising a non-transitory computer-usable medium including a computer-readable program, wherein the computer-readable program when executed by a processor on a computer causes the computer to:
   estimate journey requirements for a vehicle;
   generate a current connectivity map based on driving-related data;
   generate a real-time connectivity estimation based on sensor data recorded by one or more sensors of the vehicle, wherein the one or more sensors measure one or more of a current location of the vehicle, an acceleration of the vehicle, and a velocity of the vehicle;
   estimate services for a current journey of the vehicle based on the current connectivity map, the real-time connectivity estimation, and an estimated route for the current journey, wherein the services include a time-sensitive deal and a map application update;
   generate a prioritized list of services for the current journey of the vehicle based on one or more service deadlines of one or more of the services, wherein a service deadline of the time-sensitive deal is based on an expiration of the time-sensitive deal; and
   update one or more map applications installed in the vehicle with the map application update based on the current connectivity map indicating that the vehicle is about to enter a geographic area having limited connectivity to a mobile data network.

12. The computer program product of claim 11, wherein the computer-readable program is further configured to cause the computer to update the prioritized list of services for the current journey based on at least one of actual services requested, real-time measurement of available bandwidth, and crowd-sourced cloud data.

13. The computer program product of claim 12, wherein the computer-readable program is further configured to cause the computer to determine whether the current journey has ended and, responsive to the current journey continuing, continuing to generate the connectivity map based on driving-related data until the current journey ends.

14. The computer program product of claim 11, wherein the computer-readable program is further configured to cause the computer to cache pre-fetched content and retrieved content that are associated with the services, wherein the pre-fetched content and the retrieved content include a geographic map and corresponding driving directions associated with the current journey.

15. The computer program product of claim 11, wherein the journey requirements are based on user preferences that include a user-provided ranking of priorities for each of the services.

16. A system comprising:
a processor of a vehicle; and
a memory of the vehicle storing instructions that, when executed by the processor, cause the system to:
monitor user behavior during historical journeys to determine habits of a user;
generate a ranked list of user preferences based on the habits of the user;
estimate journey requirements for the vehicle;
generate a current connectivity map based on driving-related data;
generate a real-time connectivity estimation;
estimate services for a current journey of the vehicle based on the current connectivity map, the real-time connectivity estimation, and an estimated route for the current journey, wherein the services include a time-sensitive deal and a map application update;
generate a prioritized list of services for the journey of the vehicle based on the ranked list of the user preferences for which one or more of the services for the current journey should have a higher priority and based on one or more service deadlines of one or more of the services, wherein a service deadline of the time-sensitive deal is based on an expiration of the time-sensitive deal; and
update one or more map applications installed in the vehicle with the map application update based on the current connectivity map indicating that the vehicle is about to enter a geographic area having limited connectivity to a mobile data network.

17. The system of claim 16, wherein the memory is further configured to store instructions that cause the system to update the prioritized list of services for the current journey based on at least one of actual services requested, real-time measurement of available bandwidth, and crowd-sourced cloud data.

18. The system of claim 17, wherein the memory is further configured to store instructions that cause the system to determine whether the current journey has ended and, responsive to the current journey continuing, continuing to generate the connectivity map based on driving-related data until the current journey ends.

19. The system of claim 16, wherein the memory is further configured to store instructions that cause the system to cache pre-fetched content and retrieved content that are associated with the services, wherein the pre-fetched content and the retrieved content include a geographic map and corresponding driving directions associated with the current journey.

20. The system of claim 16, wherein the journey requirements are based on the user preferences that include a user-provided ranking of priorities for each of the services.

* * * * *